United States Patent
Nakamura et al.

(10) Patent No.: US 6,413,610 B1
(45) Date of Patent: Jul. 2, 2002

(54) STRUCTURE BODY AND A MANUFACTURING METHOD OF A STRUCTURE BODY

(75) Inventors: Hideyuki Nakamura; Takeshi Kawasaki; Toshiaki Makino, all of Kudamatsu; Toshiaki Sagawa, Yanai, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/536,641

(22) Filed: Mar. 28, 2000

(30) Foreign Application Priority Data

May 28, 1999 (JP) .......................................... 11-149134

(51) Int. Cl.⁷ ............................ B32B 7/00; B23K 20/12
(52) U.S. Cl. ......................... 428/98; 228/112.1; 52/638
(58) Field of Search ............................. 228/112.1, 135, 228/138, 265, 178, 182, 184, 2.1; 156/73.5; 428/98; 52/638

(56) References Cited

U.S. PATENT DOCUMENTS

| | | | | |
|---|---|---|---|---|
| 4,337,708 A | * | 7/1982 | Peterson | 105/397 |
| 4,653,683 A | * | 3/1987 | Pavlick | 228/182 |
| 4,778,098 A | * | 10/1988 | Rimbaud | 228/159 |
| 5,098,007 A | * | 3/1992 | Tsurda et al. | 228/125 |
| 5,199,632 A | * | 4/1993 | Takeichi et al. | 228/181 |
| 5,351,625 A | * | 10/1994 | Culligan et al. | 105/362 |
| 6,050,474 A | * | 4/2000 | Aota et al. | 228/112.1 |
| 6,051,325 A | * | 4/2000 | Talwar et al. | 428/593 |

FOREIGN PATENT DOCUMENTS

| | | |
|---|---|---|
| EP | 797043 | 9/1997 |
| JP | 9221024 | 8/1997 |

* cited by examiner

*Primary Examiner*—Tom Dunn
*Assistant Examiner*—Zidia Pittman
(74) *Attorney, Agent, or Firm*—Antonelli, Terry, Stout & Kraus, LLP

(57) ABSTRACT

A hollow frame member is constituted by joining with a truss shape by ribs 13, 13A, 13B (23, 23A, 23B) between two face plates 11, 12 (21, 22). An end portion of one of the hollow frame member 10 is connected according to the rib 13A for constituting the truss. A face plate 21 of another hollow frame member 20 is joined at a vicinity of an apex of the truss of the hollow frame member 10. A face plate of the hollow frame member 10 is joined at a vicinity of an apex of the truss of the another hollow frame member 20. A load during a friction stir joining is received according to the ribs 13A, 13B (13A, 23B). Since the truss structure is formed totally, the light weight structure and the high rigidity performance can be obtained.

21 Claims, 4 Drawing Sheets

STRUCTURE BODY AND A MANUFACTURING METHOD OF A STRUCTURE BODY

BACKGROUND OF THE INVENTION

1. Technical Field

The present invention relates to a structure body and a manufacturing method of a structure body. For example, the present invention is suited to a structure body and a manufacturing method of a structure body according to an aluminum alloy made extruded frame member which is used in a railway car or a building structure etc.

2. Prior Art

A friction stir joining method is a method in which by rotating a round rod (it is called as a rotary tool) which is inserted into a joining portion and moving the rotary tool along to a joining line of extruded frame members, and the friction stir joining portion is heated, softened and plastically fluidized and a solid-stately joined. The rotary tool is comprised of a small diameter portion which is inserted into the joining portion and a large diameter portion which is positioned at an outside of the small diameter portion of the rotary tool. The small diameter portion and the large diameter portion of the rotary tool have the same axis. A boundary between the small diameter portion and the large diameter portion of the rotary tool is inserted a little into the joining portion. The above stated technique is disclosed, for example in Japanese application patent laid-open publication No. Hei 9-309164 (EP 0797043 A2).

In FIG. 9 of this document a joining of two faces of hollow extruded frame members is carried out from one of the two faces of the hollow extruded frame member. Further, a coupling member for preventing a deformation of the hollow extruded frame member is shown.

In Japanese application patent laid open publication No. Hei 9-221024, a method for manufacturing easily a structure body of a railway vehicle. In this method, an end portion of plate of one side face of a hollow frame member is provided by projecting an end portion of plate of another side face and this projected plates are welded each other from an upper portion. Next, between another face plates are connected by using a covering plate.

A different point between the friction stir joining and an arc welding resides in that in the friction stir joining by an insertion of the rotary tool to members to be subjected to a joining a large load is acted on. This load acts mainly on an insertion direction (an axial center direction of the rotary tool) of the rotary tool. Namely, an insertion force of the tool acts on the members to be subjected to the joining.

When the hollow extruded frame members are carried out to the friction stir joining, against to a rib which connects a face plate and two parallel face plates the above stated insertion force by the rotary tool acts on, then the hollow extruded frame member is deformed. For these reasons, it is necessary to form a structure from which the deformation of the coupling member portion can be prevented.

The above stated deformation prevention means is disclosed in the above stated in Japanese application patent laid-open publication No. Hei 9-309164 (EP 0797043 A2). In this document, to a joining portion of the two hollow extruded frame members a vertical plate (it is called as a lengthwise rib) for joining two face plates of the hollow extruded frame member is provided. This lengthwise rib is positioned at an extension line of an axial center of the rotary tool. The lengthwise rib is one to which two face plates of the hollow extruded frame member are connected. To the lengthwise rib, since the large load acts concentrically, it is necessary to make thick a plate thickness of the hollow extruded frame member. For this reason, there is a limitation of an obtaining of a light weight structure coupling member.

Further, this lengthwise rib of the hollow extruded frame member will be studied from another aspect. When a face outside bending force acts on the hollow extruded frame member, it has well known that a portion dominating to a whole rigidity performance is the rib. To improve the rigidity performance against to the face outside bending force, it is desirable to arrange the rib to be consistent with toward a forty five angle direction against to the face plate which is a main stress force direction of a sharing force. However, the lengthwise rib being vertically to two sheet face plates hardly contribute as a strengthening member.

As stated in above, in regardless that the lengthwise rib hardly contribute to the improvement of the rigidity performance when the structure body is used as the strengthening member, since this rib is necessary to make thick a plate thickness of the hollow extruded frame member so as to support the insertion force during a friction stir joining time, it makes difficult the light weight structure of the coupling member of the hollow extruded frame member.

The covering plate shown in the above stated Japanese application patent laid open publication No. Hei 9-221024 is welded at a vicinity of an intersection point of a truss of the hollow frame member.

SUMMARY OF THE INVENTION

An object of the present invention is to provide a structure body having a light weight structure and a high rigidity performance and a manufacturing method of a structure body.

The above stated object can be attained in a manufacturing method of a structure body characterized in that preparing a hollow frame member in which two sheet face plates are connected with a truss shape by plural ribs, an end portion of one of said face plates is projected from an end portion of another of said face plates toward a side of said end portion, and said end portion of said one of said face plates and said end portion of said another of said face plates are connected by said plural ribs which constitute said truss; and substantially positioning a second member toward an extension direction of said another of said face plates, and joining an end portion of a second member to said end portion of said another of said face plates according to a friction stir joining.

The above stated object can be attained in a manufacturing method of a structure body characterized in that preparing a first hollow frame member in which two sheet face plates are connected with a truss shape by plural ribs, an end portion of one of said face plates is projected from an end portion of another of said face plates toward a side of said end portion, said end portion of said one of said face plates and said end portion of said another of said face plates are connected by said plural ribs which constitute said truss, and which has a seat at an end portion of said another of said face plates and at a vicinity of said truss; and preparing a second hollow frame member in which two sheet face plates are connected with a truss shape by plural ribs, an end portion of said one of said face plates is projected from an end portion of said another of said face plates toward a side of said end portion, said end portion of said one of said face plates and said end portion of said another of said face plates are connected by said plural ribs which constitute said truss, and which has a seat at an end portion of said another of said face plates and at a vicinity of said truss; and overlapping said end portion of said one of said face plates of a first hollow frame member to said seat of said second hollow frame member; overlapping said end portion of said one of said face plates of said first hollow frame member to said seat of said second hollow frame member; and joining respectively said overlapped portion.

The above stated object can be attained in a structure body comprising characterized in that a hollow frame member in which two sheet face plates are connected with a truss shape by plural ribs, an end portion of one of said face plates is projected from an end portion of another of said face plates toward a side of said end portion, and a side of said end portion of said one of said face plates and said end portion of said another of said face plates are connected by said plural ribs which constitute said truss; and a second member is positioned substantially in an extension line direction of said another of said face plates, and said end portion of said second member is joined to said end portion of said another of said face plates according to a friction stir joining.

The above stated object can be attained in a manufacturing method of a structure body characterized in that preparing a first hollow frame member in which two sheet face plates are connected with a truss shape by plural ribs, an end portion of one of said face plates is projected from an end portion of another of said face plates toward a side of said end portion, said end portion of said one of said face plates and said end portion of said another of said face plates are connected by s overlapping said end portion of said one of said face plates of said first hollow frame member to said seat of said second hollow frame member; overlapping said end portion of said one of said face plates of said second hollow frame member to said seat of said first hollow frame member; and aid plural ribs which constitute said truss, and which has a seat at an end portion of said another of said face plates and at a vicinity of said truss; and preparing a second hollow frame member in which two sheet face plates are connected with a truss shape by plural ribs, an end portion of said one of said face plates is projected from an end portion of said another of said face plates toward a side of said end portion, said end portion of said one of said face plates and said end portion of said another of said face plates are connected by said plural ribs which constitute said truss, and which has a seat at an end portion of said another of said face plates and at a vicinity of said truss; and overlapping said end portion of said one of said face plates of a first hollow frame member to said seat of said second hollow frame member; and joining respectively said overlapped portion.

The above stated object can be attained in a friction stir joining use hollow frame member, characterized in that two sheet face plates are connected with a truss shape according to plural ribs; an end portion of one of said face plates is projected from an end portion of another of said face plates toward a side of said end portion; and said end portion of said one of said face plates and said end portion of said another of said face plates is connected according to said rib which constitutes said truss.

The above stated object can be attained in a friction stir joining use hollow frame member, characterized in that two sheet face plates are connected with a truss shape according to plural ribs; an end portion of one of said face plates is projected from an end portion of another of said face plates toward a side of end portion of said hollow frame member; and said end portion of said one of said face plates and a midway of said one of said face plates is connected according to said rib which constitutes said truss.

DESCRIPTION OF THE INVENTION

Figure 1:
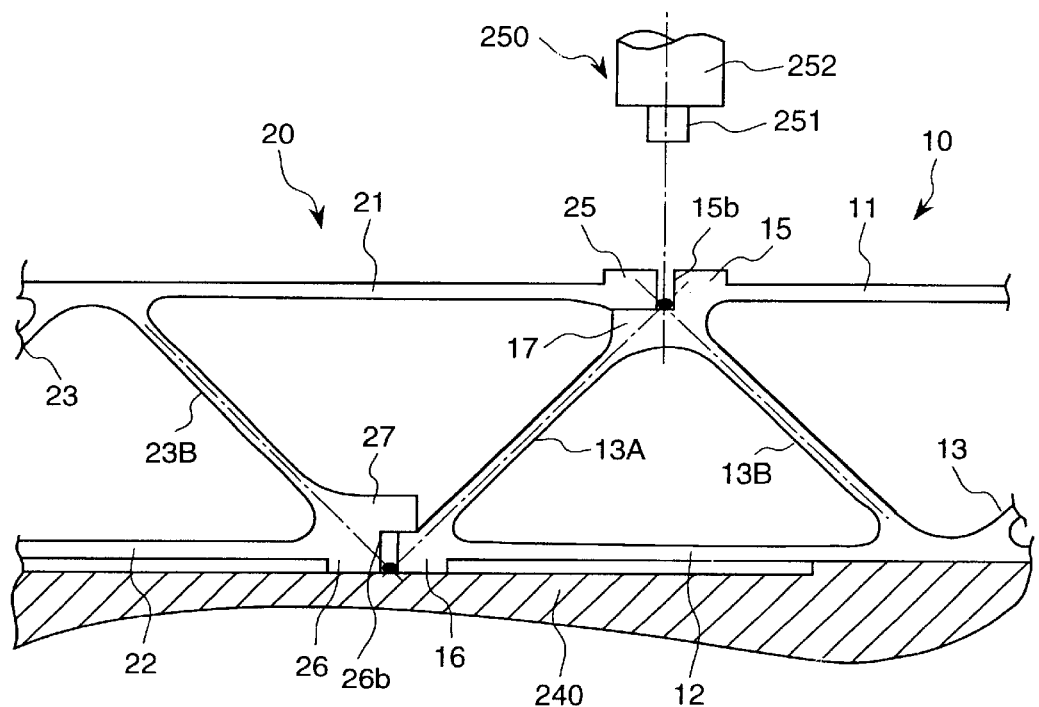
FIG. 1 is a longitudinal cross-sectional view showing an essential portion of a joining portion of one embodiment of a structure body and a manufacturing method of a structure body according to the present invention.

One embodiment of a structure body and a manufacturing method of a structure body according to the present invention will be explained from FIG. 1 to FIG. 3. As shown in FIG. 3, a car body 200 is comprised of a side structure body 201 for constituting a side face of the car body 200, a roof structure body 202 for constituting a roof of the car body 200, a stand frame 203 for constituting a floor of the car body 200, and a side structure body 204 for constituting an longitudinal direction end portion of the car body 200. Each of the side structure body 201, the roof structure body 202, and the stand frame 203 is constituted respectively by joining plural extruded frame members. A longitudinal direction of the extruded frame member is formed toward a longitudinal direction of the car body 200. The extruded frame member is a hollow frame member made of an aluminum alloy.

A constitution and a joining method of a hollow extruded frame member 10 and a hollow extruded frame member 20 for constituting the side structure body 201 will be explained. Other portions and other structure bodies are similar to the above.

Figure 2:
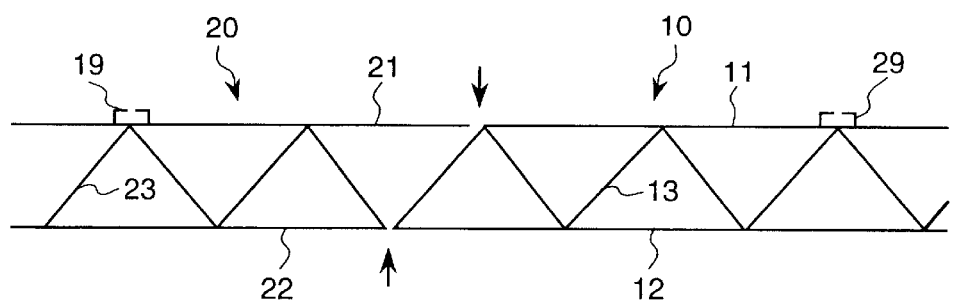
FIG. 2 is a longitudinal cross-sectional view showing a pair of hollow frame members of one embodiment of one embodiment of a structure body and a manufacturing method of a structure body according to the present invention.
Figure 3:
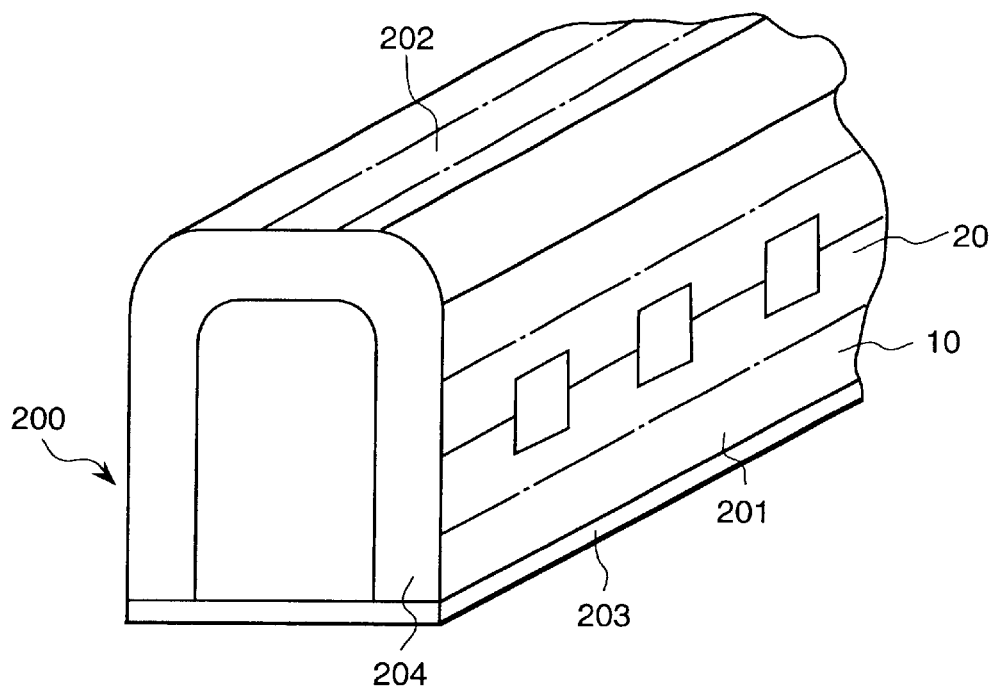
FIG. 3 is a squint view showing a car body of a railway car.

As shown in FIGS. 1 and 2, the hollow frame member 10 and the hollow extruded frame member 20 are comprised, respectively, of two sheet face plates 11, 12 and 21, 22 and truss shape arranged plural ribs 13 and 23. The two sheet face plates 11 and 12 (and the two sheet face plates 21 and 22) are substantially in parallel. A pitch of the truss according to ribs 13 and 23 is the same. The truss is constituted by the ribs 13 and 23 and a center line of a plate thickness of the face plates 11 and 12 and the face plates 21 and 22. An apex exists at a side of the face plates 11 and 12 and the face plates 21 and 22. The apex is shown by a dark round circle in FIG. 1.

At a vicinity of the apex of the truss in an inner side of the railway car, rails 19 and 29 for installing machines and apparatuses are provided integrally, as shown in FIG. 2. The rails 19 and 29 are comprised of L shape two members. The rail is a seat for installing the machines and apparatuses such as interior mounting plates and chairs, etc.

The constitution of the joining portion of the hollow extruded frame member 10 and the hollow extruded frame member 20 will be explained in connection with FIG. 1. To an end portion of the hollow frame member 10, there is a rib 13A which constitutes one side of the truss. An end portion of the face plate 12 is projected further toward an end portion side (a side of an adjacent hollow frame member 20) from an end portion of the face plate 11. The rib 13A at the end portion connects the end portion of the face plate 11 with the end portion of the face plate 12. A rib 13B connects the end portion of the face plate 11 and the face plate 12. According to the ribs 13A and 13B, an isosceles triangle truss is constituted. Other trusses are also isosceles triangle trusses.

The end portion of the face plate 21 of the hollow frame member 20 is projected further toward an end portion side (a side of an adjacent hollow frame member 10) from the end portion of the face plate 22. There is no rib which can connect the end portion of the face plate 21 and the end portion of the face plate 22.

An inner side of the end portion of the face plate 21 is overlapped with a seat 17 which is projected from the rib 13A. The seat 17 is provided at the rib 17A which is provided at a vicinity of a cross-point of the ribs 13A and 13B. An inner side of the end portion of the face plate 22 is overlapped with a seat 27 which is projected from the end portion of the face plate 22.

When the two hollow frame members 10 and 20 are abutted, the isosceles triangle shape truss is constituted according to the ribs 23B and 13A and the face plate 21. A dimension of this truss is the same to those of other trusses. Other trusses are isosceles triangle shape ones.

Raised portions 15 and 25 and raised portions 16 and 26 are provided on outface side of an abutted portion. The raised portions 15 and 25 and the raised portions 16 and 26 have the same heights and the same widths. This abutted portion is carried out to a friction stir joining. Plate thickness of the ribs 13A, 13B and 23B are thicker that those of plate thickness of other portion ribs 13 and 23. An abutted face exists on a vertical line (a line along to a normal line of the face plate) of the apex of truss which is constituted according to the ribs 13A, 13B, and 23B and the plate faces 12 and 22. From an accuracy degree of a position of a rotary tool 250, in a practical use at a vertical line at a vicinity of the apex of the truss an axial center of the rotary tool 250 is positioned.

On the hollow frame members 10 and 20, a bed 240 is mounted where the face plates 12 and 22 are made as a lower portion. From an upper portion, the rotary tool 250 is inserted to the joining portion and the friction stir joining is carried out.

Abutted faces 15b and 26b of the raised portions 15 and 25 and the raised portions 16 and 26 are vertical against the plate faces 11 and 22. Abutted faces are vertical to the member for corresponding these. A recessed portion is constituted according to the vertical faces 15b and 26b and upper faces of the seats 17 and 27. This recessed portion is opened to a face along to the face plates 11 and 22 and an end portion side of the hollow frame members 10 and 20.

The abutted faces 15b and 26b are orthogonal to the face plates 11 and 12 and the face plates 21 and 22. Namely, the abutted faces exist along to the normal line of the face plates. The abutted faces 15b and 26b exist along to a thickness direction of the hollow frame members 10 and 20.

The positions of the abutted faces 15b and 26b are positioned toward another end portion side of the hollow frame members 10 and 20 from the normal line which passes through the apex of the truss. In a case where the abutted faces 15b, 26b exist on the normal line which passes through the apex of the truss, and in a case where the end portions of other face plates 21 and 12 are short (within an allowable error), the insertion position of the rotary tool 250 approaches toward other face plates side. In this case, there is a possibility in which the load of the rib at an approached side becomes to excess. The widths of the two raised portions 15 and 25 (16 and 26) are detected, then the axial center of the rotary tool 250 is consistent with at the center.

The manufacturing method of this structure body will be explained. The hollow frame members 10 and 20 are mounted on and fixed to the bed 240. The abutted portion of the end portions of the face plates 11 and 21 (the face plates 12 and 22) is contacted to or is approached. The raised portions 15 and 25 of the abutted portion of the upper face side face plates 11 and 21 are temporarily fixed according to an arc welding from an upper portion. The temporary welding is carried out intermittently.

The raised portions 16 and 26 are mounted on the bed 240. A vicinity of a cross-point between the rib 23B and the face plate 22 is mounted on the bed 240.

With this condition, the rotary tool 250 of a friction stir joining apparatus is inserted from the upper portion to the abutted portion of the raised portions 15 and 25 and is moved along to a joining line and then the friction stir joining is carried out. The axial center of the rotary tool 250 is a vertical direction. However, against an advancing direction of the rotary tool 250 the axial center is inclined as already known. The width of the two raised portions 15, 25 is detected and the axial center of the rotary tool 250 is positioned at the axial center.

The rotary tool 250 comprises a large diameter portion 252 and a small diameter portion 251 at a tip end of the large diameter portion 252. The tip end of the small diameter portion 251 of the rotary tool 250 is inserted deeply from an upper face of the seat 17. A lower end of the large diameter portion 252 of the rotary tool 250 is positioned between the apex of the raised portions 15 and 25 and the outer faces of the face plates 11 and 21. A diameter of the large diameter portion 252 of the rotary tool 250 is smaller than a width which is comprised of the two raised portions 15 and 25. The small diameter portion 251 of the rotary tool 250 forms a screw member.

According to this friction stir joining a clearance formed between the abutted portion of the face plates 11 and 12 is buried and joined.

Next, this structure body is reversed and mounted on the bed 240. From the upper portion of the raised portions 16 and 26 the temporary fixing is carried out by the arc welding. Next, from the upper portion of the raised portions 16 and 26 according to the rotary tool 250 the friction stir joining is carried out. This friction stir welding is carried out similarly to the above.

Finally, the raising portion of the outer face side of the railway car body 200 is cut off and is made to have the same face to the face plate.

According to the above, the axial center of the rotary tool 250 exists on the apex of the truss according to the two ribs 13A and 13B (the ribs 13A and 23B) or on the vertical linear line which passes the vicinity of the apex. The insertion force during the friction stir joining is supported by the two ribs 13A and 13B (13A and 23B) which are arranged toward the axial center of the rotary tool 250. For this reason, the bending of the ribs 13A, 13B, and 23B can be retrained. The plate thickness of the ribs 13A, 13B, and 23B can be thin and a light weight structure can be obtained. Of course, the bending of the face plates 11 and 12 can be restrained. The plate thickness of the ribs 13A, 13B, 23B is thicker than the plate thickness of other ribs 13 and 23.

Since the bed 240 for supporting the ribs 13A, 13B, and 23B exists, the bending of the face plate can be prevented.

Further, after the friction stir joining, when it is used as the structure body, all of the structure body are constituted substantially according to the truss structure. For this reason, the face outer bending rigidity performance can be improved and the light weight structure can be obtained.

The apex according to the two ribs 13A and 13B (two ribs 13A and 23B) may positioned at the outer face side from the face plates 11 and 21.

The joining according to the above embodiment is carried out according to the friction stir joining, however one of the joining or both of the joining may be carried out according to the arc welding. In the case of the arc welding, since there is no load during the joining, the ribs 13A, 13B, and 23B can be made thin. An upper face of a projecting seat 17 and a lower face of the seat 17 may be inclined.

In the above stated embodiment of the structure body and the manufacturing method of the structure body, the face plates 11 and 12 and the face plates 21 and 22 are in parallel, but it can correspond a case where one of the face plates is inclined with the another face plate.

Figure 4:
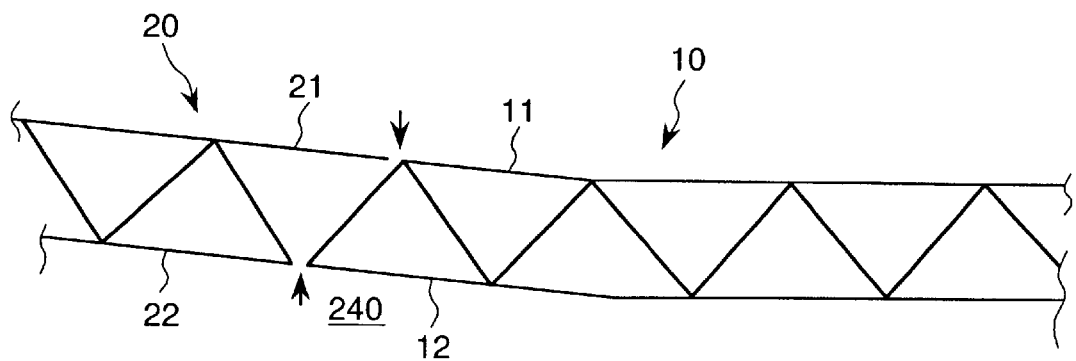
FIG. 4 is a longitudinal cross-sectional view showing an essential portion of a joining portion of another embodiment of a structure body and a manufacturing method of a structure body according to the present invention.

FIG. 4 shows a further embodiment of a structure body and a manufacturing method of a structure body and a case with which the normal line of the face plate of the joining portion is inclined. One end of the hollow frame member 10 is horizontal. The hollow frame members 10 and 20 are mounted on the bed 240. This causes easily to the joining line of the end portion of the side structure body 201. The axial center of a rotary body exists along to the normal line of the face plate. This normal line passes through the vicinity of the apex of the truss. An arrow mark shows the position and the direction of the rotary tool 250.

Figure 5:
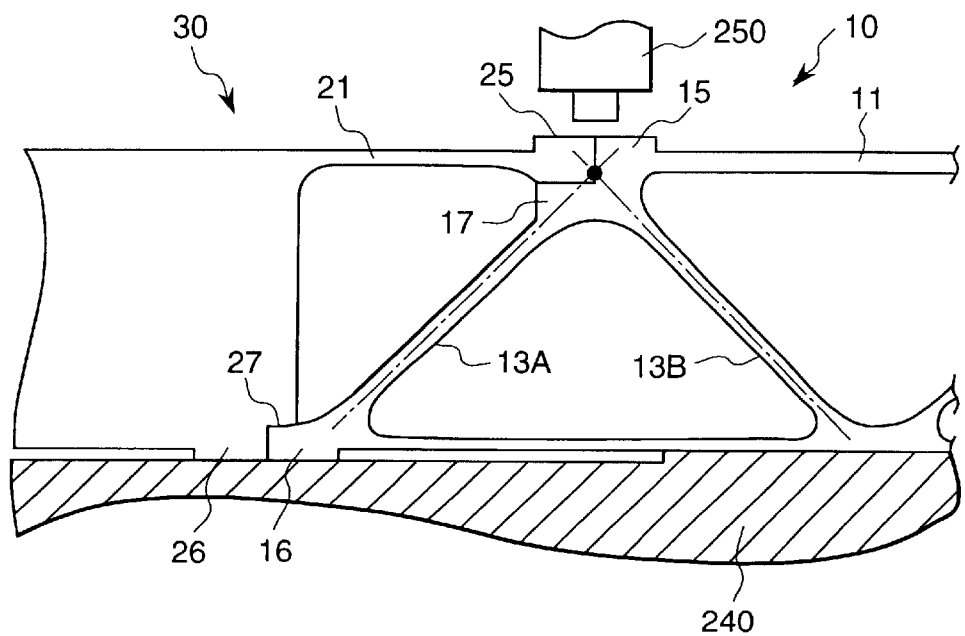
FIG. 5 is a longitudinal cross-sectional view showing an essential portion of a joining portion of another embodiment of a structure body and a manufacturing method of a structure body according to the present invention.

FIG. 5 shows a further embodiment of a structure body and a manufacturing method of a structure body and will be explained. The hollow frame member 20 is a block shape member 30. It does not matter whether the member 30 is hollow or not. Others in this embodiment according to the present invention are similarly to those of the embodiment shown in FIG. 1. In a case where the member 30 is a hollow frame member, the seat 27 is provided to a rib for connecting the raised portion 26 and the face plate 21. This rib is substantially orthogonal to (along to the normal line of the face plate) the face plate 11. The face plate 21 is substantially arranged along to an extension line of the face plate 11.

Figure 6:
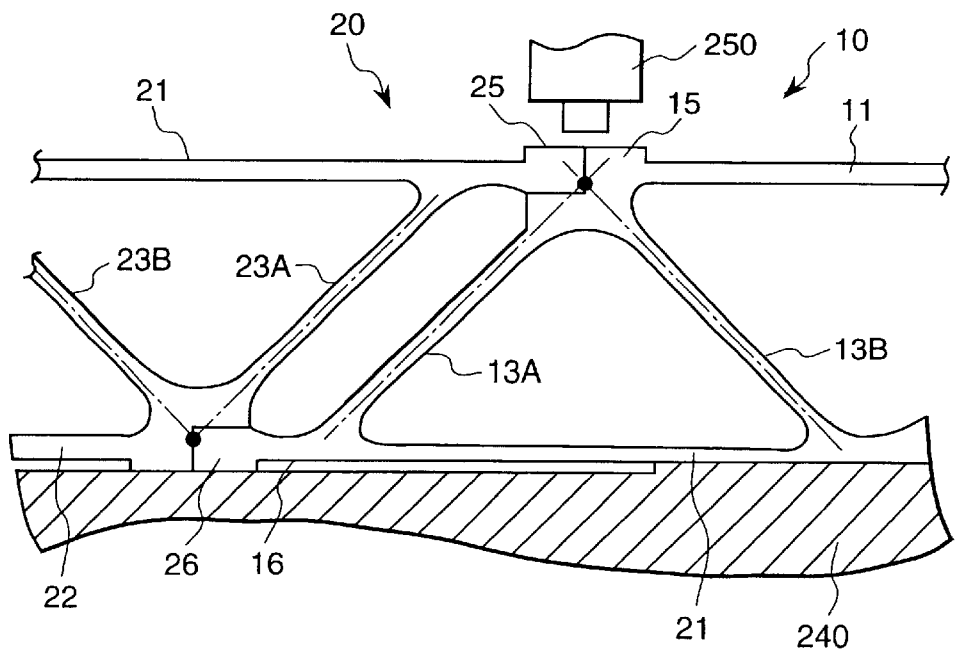
FIG. 6 is a longitudinal cross-sectional view showing an essential portion of a joining portion of another embodiment according to the present invention.

FIG. 6 shows a further embodiment of a structure body and a manufacturing method of a structure body and will be explained. In the hollow frame member 20 shown in FIG. 1 there is no rib for connecting the end portion of the face plate 21 and the end portion of the face plate 22. On the other hand, to the end portion of the face plate there are the raising portions 25 and 26. For this reason, the manufacture of the rising portion 25 is difficult. An aim of the embodiment according to the present invention shown in FIG. 6 is to improve the above stated embodiment. There is a rib 23A for connecting the end portion of the face plate 21 and the end portion of the face plate 22. The isosceles triangle is formed according to the ribs 23A and 23B and the face plate 21. With this structure, the insertion force is supported according to the two ribs 23A and 23B. The plate thickness of the ribs 13A, 13B, 23A, and 23B can be made thin. After the manufacture of the hollow frame member 20, the rib 23A can be removed, after that as shown in FIG. 1 the friction stir joining can be carried out.

Figure 7:
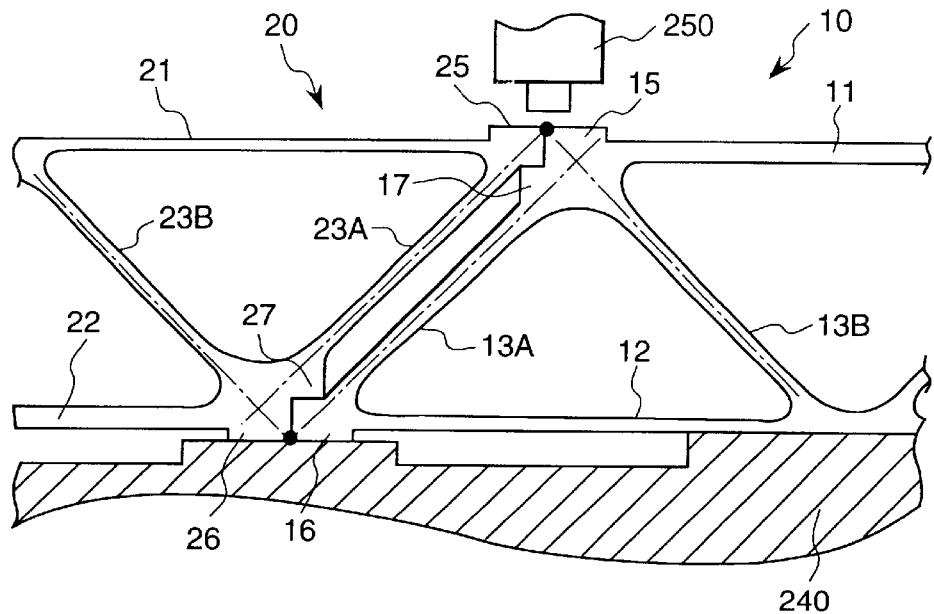
FIG. 7 is a longitudinal cross-sectional view showing an essential portion of a joining portion of another embodiment of a structure body and a manufacturing method of a structure body according to the present invention.

FIG. 7 shows a further embodiment of a structure body and a manufacturing method of a structure body, in FIG. 7 the rib 23A is provided to approach to the end portion of the hollow frame member. An isosceles triangle is constituted according to a center line of the rib 23A and a center line of the rib 13B. At the vertical linear line which passes through a cross-point of both center lines the axial center of the rotary tool 250 exists. According to this structure, the insertion force can be supported according to the three ribs.

Figure 8:
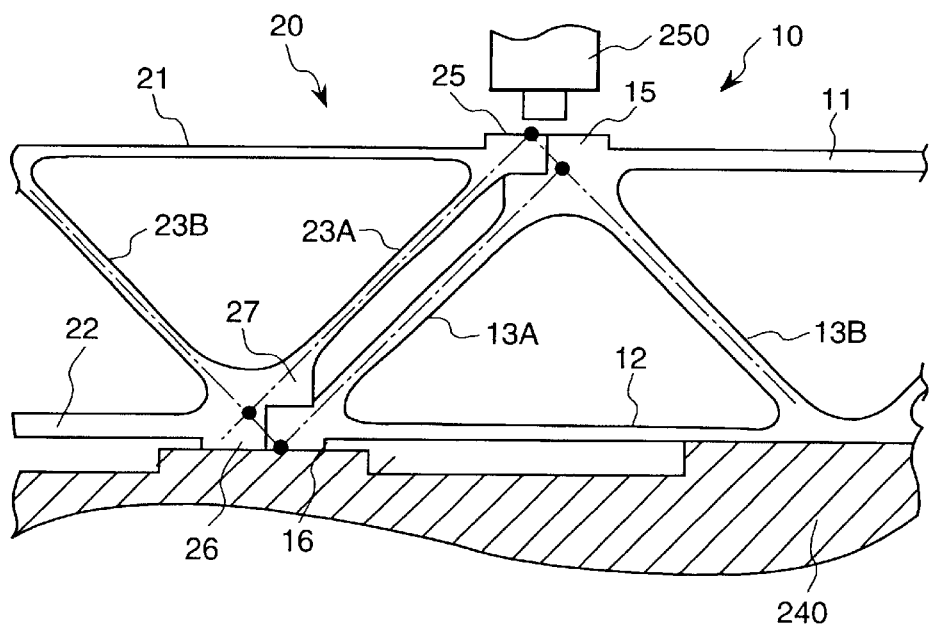
FIG. 8 is a longitudinal cross-sectional view showing an essential portion of a joining portion of another embodiment of a structure body and a manufacturing method of a structure body according to the present invention.

FIG. 8 shows a further embodiment of a structure body and a manufacturing method of a structure body, in FIG. 8, the insertion position of the rotary tool 250 is formed between two cross-points.

A technical range according to the present invention is not limited by the wordings defined in each claim of what is claimed is or the wordings stated on the means for solving the problems and further it refers also to the range in which the man belonged in this technical field can be placed easily:

According to the present invention, since the vicinity of the apex according to the two ribs for connecting two sheet face plates is joined as the joining portion, the light weight structure and the high rigidity performance structure body can be provided.

What is claimed is:

1. A structure body comprising:
   a first hollow frame member comprising first and second sheet face plates connected by a plurality of ribs in a truss shape, an end portion of the second face plate projecting from an end portion of the first face plate toward a side of the end portion of the second face plate, the end portions of the first and second face plates being joined by one of said plurality of ribs; and
   a second member positioned adjacent to the side of the first hollow frame member,
   a friction stir weldjoining an end portion of said second member to said end portion of said first face plate of said first hollow frame member.

2. The structure body according to claim 1, wherein the second member comprises a second hollow frame member comprising first and second sheet face plates connected by a plurality of ribs in a truss shape, an end portion of the first face plate projecting from an end portion of the second face plate toward a side of the end portion of the first face plate, wherein a seat is provided at the end portion of said second face plate;
   wherein said end portion of said second face plate of the first hollow frame member is overlapped to said seat of said second hollow frame member; and
   said end portion of said second face plate of the first hollow frame member is joined to said end portion of said second face plate of said second hollow frame member.

3. A structure body according to claim 2, characterized in that
   said joining is carried out according to a friction stir joining.

4. A structure body according to claim 3, wherein a position of the friction stir joining is positioned at an apex of said truss of said end portion.

5. A method for manufacturing a structural body, comprising:

providing a first member, the first member being a hollow frame member comprising first and second sheet face plates connected by a plurality of ribs in a truss shape, an end portion of the second face plate projecting from an end portion of the first face plate toward a side of the end portion of the second face plate, the end portions of the first and second face plates being joined by one of the plurality of ribs;

positioning a second member adjacent the side of the first member; and friction stir welding an end portion of the second member to the end portion of the first plate of the first member.

6. The method according to claim 5, wherein the end portion of the first face plate is joined to the second face plate by two ribs.

7. The method according to claim 6, wherein the two ribs and a portion of the second face plate between the two ribs form an isosceles triangle in cross section.

8. The method according to claim 7, wherein friction stir welding is carried out in a vicinity of an apex of the isosceles triangle.

9. The method according to claim 6, wherein the two ribs and a portion of the second face plate between the two ribs form a triangle in cross section and wherein friction stir welding is carried out in a vicinity of an apex of the triangle.

10. The structural body produced by the method of claim 5.

11. The method according to claim 6, wherein said second member comprises a second hollow frame member comprising first and second sheet face plates connected by a plurality of ribs in a truss shape, an end portion of the first face plate projecting from an end portion of the second face plate toward a side of the end portion of the first face plate, wherein a seat is provided at the end portion of said second face plate;

wherein said end portion of said second face plate of the first hollow frame member is overlapped to said seat of said second hollow frame member; and said end portion of said second face plate of the first hollow frame member is joined to said end portion of said second face plate of said second hollow frame member.

12. The method according to claim 11, wherein the end portions of the first and second face plates of said second hollow frame member are joined by one of the plurality of ribs.

13. The method according to claim 12, wherein the end portion of the second face plate of said second hollow frame member is joined to the first face plate by two ribs.

14. The method according to claim 13, wherein the two ribs and a portion of the second face plate of said first hollow frame member between the two ribs form an isosceles triangle in cross section.

15. The method according to claim 13, wherein friction stir welding is carried out in a vicinity of an apex of the isosceles triangle of said second hollow frame member.

16. The method according to claim 13, wherein the two ribs and a portion of the first face plate between the two ribs form a triangle in cross section and wherein friction stir welding is carried out in a vicinity of an apex of the triangle of said second hollow frame member.

17. The structural body produced by the method of claim 11.

18. The method according to claim 2, wherein the end portion of the second face plate of said second hollow frame member is joined to the first face plate by two ribs.

19. The method according to claim 18, wherein the two ribs and a portion of the first face plate of said second hollow frame member between the two ribs form an isosceles triangle in cross section.

20. The method according to claim 19, wherein friction stir welding is carried out in a vicinity of an apex of the isosceles triangle of said second hollow frame member.

21. The method according to claim 18, wherein the two ribs and a portion of the first face plate between the two ribs form a triangle in cross section and wherein friction stir welding is carried out in a vicinity of an apex of the triangle of said second hollow frame member.

* * * * *